United States Patent
Fu et al.

(10) Patent No.: US 9,621,646 B2
(45) Date of Patent: Apr. 11, 2017

(54) METHOD, DEVICE AND SYSTEM FOR PROVIDING AND SELECTING CANDIDATE NODES FOR LIVE STREAMING SERVICES

(75) Inventors: Bin Fu, Beijing (CN); Feng Yu Mao, Beijing (CN); Ruo Yuan Zhang, Beijing (CN); Jian Hui Wang, Beijing (CN)

(73) Assignee: Nokia Solutions and Networks OY, Espoo (FI)

(*) Notice: Subject to any disclaimer, the term of this patent is extended or adjusted under 35 U.S.C. 154(b) by 282 days.

(21) Appl. No.: 14/343,962

(22) PCT Filed: Sep. 9, 2011

(86) PCT No.: PCT/CN2011/001534
§ 371 (c)(1),
(2), (4) Date: Jul. 11, 2014

(87) PCT Pub. No.: WO2013/033869
PCT Pub. Date: Mar. 14, 2013

(65) Prior Publication Data
US 2014/0351451 A1    Nov. 27, 2014

(51) Int. Cl.
*H04L 29/08*    (2006.01)
*H04L 29/06*    (2006.01)

(52) U.S. Cl.
CPC ........ *H04L 67/104* (2013.01); *H04L 65/4076* (2013.01); *H04L 65/80* (2013.01);
(Continued)

(58) Field of Classification Search
None
See application file for complete search history.

(56) References Cited

U.S. PATENT DOCUMENTS 6,832,239 B1 * 12/2004 Kraft ....................... H04L 67/06
                                                    709/203
7,337,231 B1 *  2/2008 Li ................................ 709/231
(Continued)

FOREIGN PATENT DOCUMENTS

CN       1852252 A    10/2006
CN     101087403 A    12/2007
(Continued)

OTHER PUBLICATIONS

Yang, Beverly, and Hector Garcia-Molina. "Improving search in peer-to-peer networks." Distributed Computing Systems, 2002. Proceedings. 22nd International Conference on. IEEE, 2002.*
(Continued)

*Primary Examiner* — Scott B Christensen
*Assistant Examiner* — Lam Do
(74) *Attorney, Agent, or Firm* — Laurence A. Greenberg; Werner H. Stemer; Ralph E. Locher

(57) ABSTRACT

Candidate nodes for live streaming services are provided and selected. A candidate nodes list for live streaming services is provided. The method includes collecting information of each node involved in the live streaming services; based on the collected information, calculating progress factors of each node; comparing the collected information of each node with load thresholds; sorting the nodes, the collected information of which are below the load thresholds, on the basis of the calculated progress factors; and forming the candidate nodes list by a number N of first N nodes of the sorted nodes. The candidate node for live streaming services may also be selected by: based on information involved in the live streaming services, calculating progress factors; reporting the calculated progress factors and requesting for candidate nodes list; selecting a candidate node from the candidate nodes list according to
(Continued)

delay requirements and overlay policies of the live streaming services.

29 Claims, 5 Drawing Sheets

(52) U.S. Cl.
CPC ...... *H04L 67/1008* (2013.01); *H04L 67/1029* (2013.01); *H04L 67/2842* (2013.01)

(56) References Cited

U.S. PATENT DOCUMENTS

| | | | |
|---|---|---|---|
| 7,411,901 B1* | 8/2008 | Alexander et al. | 370/230 |
| 8,117,487 B1* | 2/2012 | Raut et al. | 714/4.11 |
| 8,892,761 B1* | 11/2014 | Dingle et al. | 709/231 |
| 2002/0156893 A1* | 10/2002 | Pouyoul et al. | 709/225 |
| 2003/0126183 A1 | 7/2003 | Wu et al. | |
| 2004/0015583 A1* | 1/2004 | Barrett et al. | 709/224 |
| 2004/0165534 A1* | 8/2004 | Claseman | 370/241.1 |
| 2004/0260811 A1* | 12/2004 | Cherkasova | H04L 29/06 709/225 |
| 2005/0120105 A1 | 6/2005 | Popescu et al. | |
| 2007/0162611 A1* | 7/2007 | Yu et al. | 709/232 |
| 2007/0234327 A1* | 10/2007 | Baxter et al. | 717/151 |
| 2009/0138618 A1* | 5/2009 | Li et al. | 709/242 |
| 2009/0238182 A1 | 9/2009 | Yanagihara | |
| 2009/0300673 A1* | 12/2009 | Bachet et al. | 725/31 |
| 2010/0332674 A1 | 12/2010 | van Gassel et al. | |
| 2011/0153724 A1* | 6/2011 | Raja et al. | 709/203 |
| 2012/0151051 A1 | 6/2012 | Zhang et al. | |
| 2012/0179834 A1* | 7/2012 | van der Schaar et al. | 709/231 |
| 2013/0007218 A1* | 1/2013 | Shah et al. | 709/219 |
| 2013/0028143 A1* | 1/2013 | Vasseur et al. | 370/256 |

FOREIGN PATENT DOCUMENTS

| | | |
|---|---|---|
| CN | 101969448 A | 2/2011 |
| JP | 2003188918 A | 7/2003 |

OTHER PUBLICATIONS

Roverso, Roberto, et al. "On the feasibility of centrally-coordinated peer-to-peer live streaming." Consumer Communications and Networking Conference (CCNC), 2011 IEEE. IEEE, 2011.*

Fecheyr-Lippens, Andrew. "A review of HTTP live streaming." Internet Citation (2010): 1-37.*

Setton, Eric, Jeonghun Noh, and Bernd Girod. "Rate-distortion optimized video peer-to-peer multicast streaming." Proceedings of the ACM workshop on Advances in peer-to-peer multimedia streaming. ACM, 2005.*

Osterloh, Heather. "IP Routing: From Basic Principles to Link State Protocols." InformIT: The Trusted Technology Source for IT Pros and Developers. N.p., Mar. 29, 2002. Web. Aug. 15, 2016.*

Pantos, R., "HTTP Live Streaming draft-pantos-http-live-streaming-12", Oct. 14, 2013, Apple, Inc.

Livadas, C., "An Evaluation of Three Application-Layer-Multicast Protocols", Sep. 25, 2002, Laboratory for Computer Science, MIT.

Xing Chen et al, "Provide VoD Service in Peer-to-Peer Network using Offset Ranking and Epidemic Diffusion", Consumer Communications and Networking Conference, 2009. CCNC 2009. 6th IEEE, IEEE, Piscataway, NJ, USA, (Jan. 10, 2009), doi:10.1109/CCNC.2009.4784891, ISBN 978-1-4244-2308-8, p. 1-6, XP031425563 [A].

* cited by examiner

METHOD, DEVICE AND SYSTEM FOR PROVIDING AND SELECTING CANDIDATE NODES FOR LIVE STREAMING SERVICES

The present invention generally relates to a method for providing candidate nodes for live streaming services, a corresponding device and system, also relates to a method for selecting candidate nodes for live streaming services, a corresponding device and system.

Application layer streaming is widely used in Internet to provide various live broadcast/multicast services. For example, HTTP live streaming (also known as HLS) is the most popular streaming communications protocol nowadays. By means of live streaming, large amount of concurrent viewers watch the same media stream. However, there will be a flash crowd problem, since any single media server's computing capability and network throughput are not enough to provide services for so many viewers simultaneously. For this reason, Content Delivery Network (CDN) is widely used to optimize network traffics and to provide enormous delivery capabilities to the viewers. Such functions of CDN can be realized by utilizing Application Layer Multicast (ALM) technologies, in which CDN nodes are organized in a certain logic to distribute media.

Current CDN always works in best-effort mode, and the delay of media delivery at CDN part is unpredictable. So far, no CDN service provider promises media delivery delay indicators. However in the case of live streaming, delay is very important for user experience. For example, when two groups of audience watch the same live football match program at different screens, one group cheers for a goal but the other group is still calm because their play progress falls far behind the cheering group. This is always depressed for user experience and generally caused by the ALM algorithms used in CDN.

As analyzed by Carl Livadas in "An Evaluation of Three Application-Layer Multicast Protocols" (clivadas@lcs.mit.edu, Sep. 25, 2002), existing ALM algorithms such as Narada, NICE etc. prefer to choose the nodes with shorter "distance" to the root node, which is calculated in hops. However, it is not objective in many cases. For example, a node A in a path may have a big delay. If a downstream node B selects the node A as the media source due to less hops to root media source, then the node B and all its downstream nodes will inherit the big delay caused by the node A. Obviously in this case choosing another node with more hops to the media source but having shorter delay will be much better.

Another problem is that the delay of media delivery, that is the time difference between the media progress at a node and that at the source node, at each node is unpredictable, because the hops to source node can neither be used to calculate time delay, nor give a rough estimation of the time delay.

It is also problematic, when a node in the path leaves and its downstream nodes will switch to the other nodes, so as to get media. Usually, the downstream node can only choose a node which it has contact with. But if all these nodes' play progresses are later than the left node, i.e. the left node has the fastest progress in all of its contacting nodes, the media play continuity will be threatened. A buffering time which is the time difference between play progress and download progress may help to alleviate the problem, but if the node chooses one of these nodes which it has contact with and whose play progresses are later than the left node, the buffering time will be shortened because the new upstream node's media source is later than previous upstream node's. Such as shown in FIG. 1, if the download time is unchanged when the downstream node is switched to a substitute node, the buffering time at C' will be shortened. And as time passes, the buffering time will be exhausted and there is a discontinuity problem again.

The popular ALM algorithms focus on building full distributed overlay, in which the nodes are organized in tree or mesh mode, as introduced in Carl Livadas' "An Evaluation of Three Application-Layer Multicast Protocols". In tree mode, each node delivers media to its downstream nodes. To solve saturation issue, multiple-tree mode is developed so that one node can get media source from alternative node when its upstream node leaves. Mesh-based mode also can be used since there's no saturation issue naturally. However these methods focus on media availability, i.e. how a node to get necessary media, but do not consider user experience, especially media delivery continuity and delay for live streaming. Many research works have been done on how to optimize the overlay topology, how to tackle with abnormal case such as node leave etc. so that the stream can continue.

In Apple's HTTP live streaming document ("draft-pantos-http-live-streaming-06", under http://datatracker.ietf.org/doc/draft-pantos-http-live-streaming/?include_text=1, R. Pantos, Apple Inc.), a complete media file or dynamic media stream is cut into many pieces, each contains a segment of stream, and a playlist file is defined to describe the pieces in sequence. In the playlist file, each piece is identified by a Uniform Resource Identifier (URI), preceded by a tag (namely EXTINF) including the duration of the piece (a media file segment). This makes it possible to calculate the play progress of each node by the EXTINF of all previous pieces. Comparing the play progress measured by seconds with that of the first node of CDN (the entrance node for media source injection), the delay caused by CDN will be determined. When the delay of a node reaches or is close to the promised delay threshold, none of the other nodes should be put as its downstream node.

U.S. Pat. No. 7,450,580 B2 describes an ALM architecture, in which routing control is handled by routing controller and data copying is done by a plurality of dedicated data copying devices. Thus, such ALM architecture can achieve better efficiency, but it does not provide any idea about delay optimization or control of the maximum delay.

And in US 2009/0238182 A1, a connection destination introduction server is introduced in ALM. When the connection destination introduction server receives a connection destination candidate introduction request message, the connection destination introduction server searches nodes Nn connectable to the downstream side from topology management information and returns a connection destination candidate response message including location information (node information such as IP address, port number) of one or more connection destination candidates thus searched. However, the delay at each node still cannot be optimized and the media play continuity cannot be assured.

This invention is used in CDN to optimize delay and control the maximum delay, consequently to improve user experience for live streaming service. The basic idea of the present invention is to consider the play progress of existing nodes when the media delivery overlay is built.

An object of the invention is to provide methods for providing a candidate nodes list for live streaming services and selecting candidate node for live streaming services, corresponding devices and systems.

According to one aspect of the invention, a first method for providing a candidate nodes list for live streaming services is provided, which comprises the following steps:

collecting information of each node involved in the live streaming services, calculating progress factors of each node based on the collected information, comparing the collected information of each node with load thresholds, sorting the nodes, the collected information of which are below the load thresholds, on the basis of the calculated progress factors, and forming the candidate nodes list by a number N of first nodes of the sorted nodes.

Preferably, N is a configurable parameter, which can be configured by OAM (Operation Administration and Maintenance).

According to a preferred embodiment of the present invention, the information of each node includes progress information, load information and contact information of the node. Specifically, the load information includes load level with regard to CPU, memory, disk space and bandwidth etc., and the contact information of the node includes contact IP address, contact port number for media download, used transport protocol etc.

In one embodiment of the present invention, the progress factors include download progress DP and supply progress SP. The download progress DP is defined as time scale of the latest continuous media piece getting from upstream node. The supply progress SP is defined as time scale of the latest media piece affordable for download.

In the other preferred embodiment of the present invention, the progress factors are calculated by means of the piece number of each node. Alternatively, the progress factors are calculated by summing up the durations of all previous media pieces or by making up the previous pieces.

In an embodiment of the present invention, the load thresholds include ordinary load threshold and extreme load threshold.

In the first method of the present invention, all the nodes whose load level is beyond the extreme load threshold are excluded. In normal case, the nodes whose load level is beyond the ordinary load threshold are excluded.

In the first method of the present invention, the step of sorting is performed in descending order.

If there are two or more nodes having the same supply progress SP, the node with lighter load is put in front of the others.

When a node leaves, the nodes whose supply progress SP is lower than the supply progress SP of the left node are excluded.

If no node whose load level is below the ordinary load threshold has higher supply progress SP than the supply progress SP of the left node, the candidate node will be searched in the nodes whose load level is beyond the ordinary load threshold and below the extreme load threshold.

According to the preferred embodiment of the present invention, the ordinary load threshold and the extreme load threshold are preconfigured by OAM. Preferably, the ordinary load threshold and the extreme load threshold are decided upon overlay of the live streaming services. For example, the ordinary load threshold can be 90% of overall load, while the extreme load threshold can be 92% of overall load.

In the first method of the present invention, if the number of the available nodes is less than N, all the available nodes are included in the candidate nodes list.

According to another aspect of the invention, a device for providing a candidate nodes list for live streaming services is provided, which can be used to perform the first method of the present invention.

According to the other aspect of the invention, a system for providing a candidate nodes list for live streaming services is provided, which comprises the device for performing the first method of the present invention.

According to the other aspect of the present invention, a second method for selecting a candidate node for live streaming services is provided, which comprises the following steps:

calculating progress factors based on information involved in the live streaming services, reporting the calculated progress factors and requesting for candidate nodes list, selecting a candidate node from the candidate nodes list according to delay requirements and policies for overlay of the live streaming services.

Preferably, the policies for overlay of the live streaming services include the policies of depth-first and breadth-first in tree traversal algorithms.

In a preferred embodiment of the present invention, the progress factors are calculated by summing up the durations of all previous media pieces. And the policies for overlay of the live streaming services are indicated in a parameter returned with the candidate nodes list.

According to the other aspect of the present invention, a device for selecting a candidate node for live streaming services is further provided, which can be used to perform the second method according to the present invention.

According to the other aspect of the present invention, a system for selecting a candidate node for live streaming services is provided, which comprises the device for performing the second method according to the present application.

In the present invention, the live streaming services are HTTP live streaming services or other progressive download streaming services.

Thus, in comparison with the prior arts, the present invention can optimize delay, since the delay at each node instead of the hops has been considered when the overlay is constructed. The present invention also can control the biggest delay at CDN part, because each node will measure its delay and choose qualified path for media download. And the present invention can provide good service continuity.

The invention will be described in more detail with reference to the drawings below, wherein, FIG. 1 shows the situation of the buffering time change during the build of the media delivery overlay;

FIG. 2 shows the flowchart of the method for providing a candidate nodes list for live streaming services according to the present application;

FIG. 3 schematically shows the construction of the media delivery overlay by means of the method according to the invention;

Figure 6:
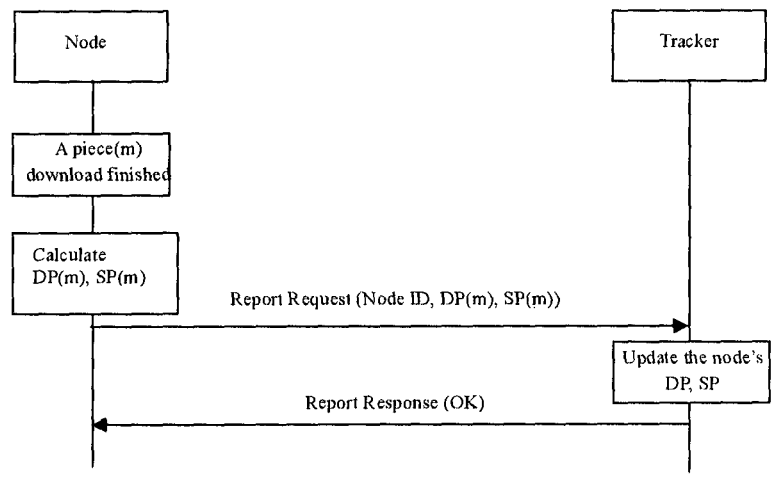
Figure 7:
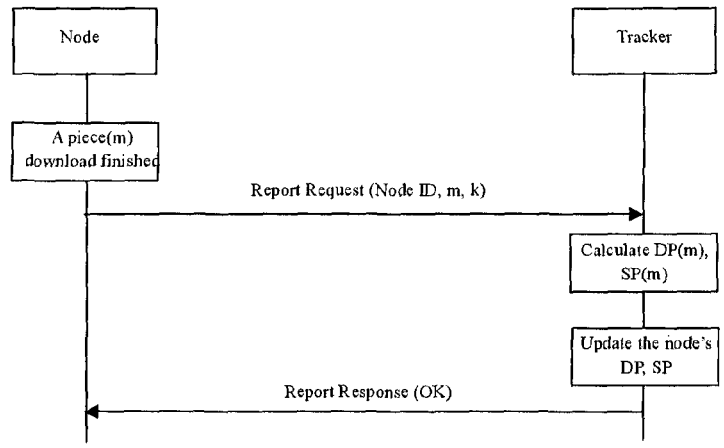
Figure 8:
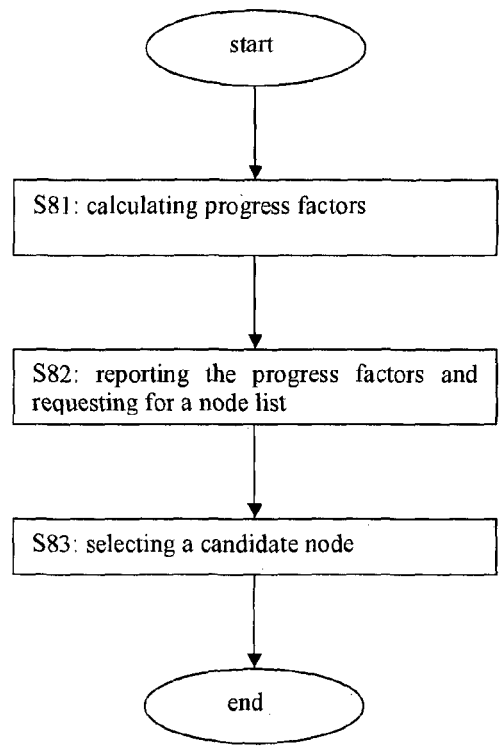

FIG. 6 schematically shows the process for calculating DP and SP at node side;

FIG. 7 schematically shows the process for calculating DP and SP at Tracker side; and FIG. 8 shows flowchart of the method for selecting a candidate node for live streaming services according to the present application.

In the present invention, a Tracker function is introduced to collect the progress information of each node and direct the construction of the overlay. When a node leaves, the Tracker can assign suitable nodes for the downstream nodes, which have similar media progress as the left node, so that the node can keep smooth play of media without shortening its buffering time.

Figure 1:
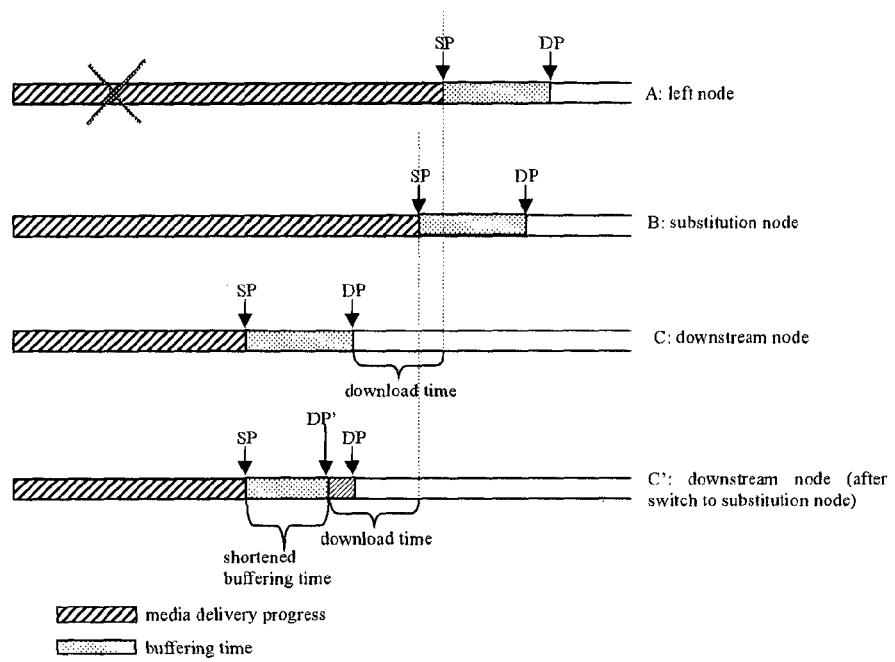

FIG. 1 shows the situation of the buffering time change during the build of the media delivery overlay.

Here, in order to describe the various progresses involved during the build of the media delivery overlay separately, two progress concepts, Download Progress (DP) and Supply Progress (SP), are firstly defined. SP is the time scale of the latest media piece affordable for download, and DP is the time scale of the latest continuous media piece getting from upstream node(s). The time interval between DP and SP is the buffering time. If a node's upstream node breaks down, the node can still supply its downstream nodes with the buffered media pieces to avoid the diffusion of the impact caused by the breakdown of the upstream node. If the node can find a new upstream as a substitute node before the buffered media pieces are exhausted, then there's no impact on the downstream node. Later on, the node will download more "greedily" until it has complemented the buffering time. In ordinary case, SP should be equal to DP minus a fixed buffering time.

However, as mentioned in the above, if the downstream node chooses one of these nodes which it has contact with and whose play progresses are later than the left node, the buffering time will be shortened. And then the stream will be discontinued.

Figure 2:
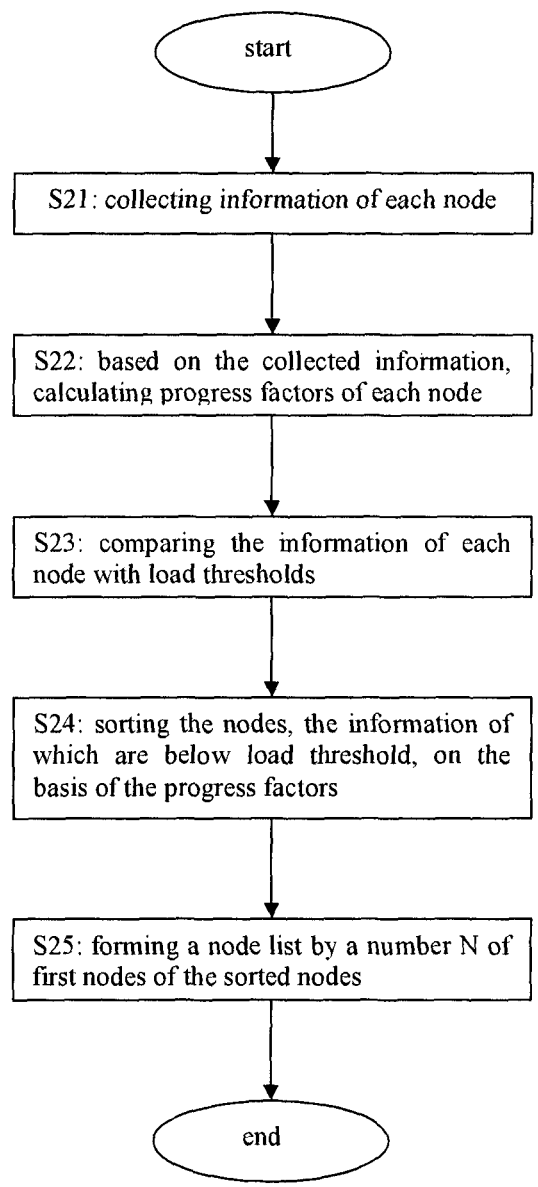

FIG. 2 shows a flowchart of the method for providing a candidate nodes list for live streaming services according to the present application.

At step S21, Tracker firstly collects information of each node involved in the live streaming services. Based on the collected information, Tracker calculates progress factors of each node at step S22. And then, at step S23, the collected information of each node is compared with load thresholds. The nodes, whose collected information are below the load thresholds, are sorted on the basis of the calculated progress factors at step S24. So, at step S25, the candidate nodes list is formed of the first N nodes, wherein N is configured by OAM. For example, N can be configurable per node according to the capabilities of the node.

Figure 3:
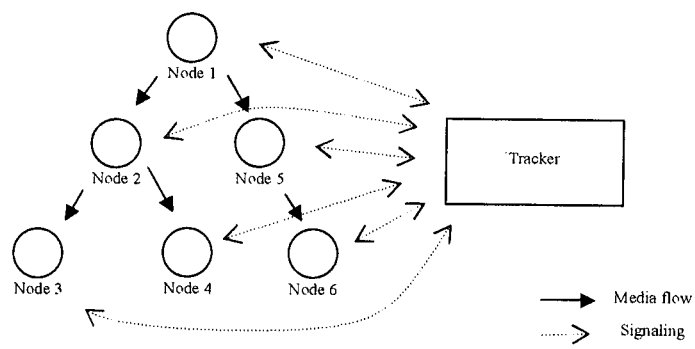

FIG. 3 schematically shows the construction of the media delivery overlay for the HTTP Live Streaming by means of the method according to the invention. The embodiment shown in FIG. 3 is performed in tree-based architecture.

As shown in FIG. 3, Tracker is used to collect the progress information of each of the nodes 1-6 and other additional information, and then employ appropriate policies for overlay construction and node assignment as well. The additional information comprises load information and a node's contact information, which is used when another node wants to connect it. The contact information includes for example the node's contact IP address, the contact port number for media download, the used transport protocol and so on. The load information refers to the information on the usage of the resources, such as CPU, memory, disk space, bandwidth etc., in a node. A CDN node reports its load information periodically to Tracker. Only if a CDN node wants to join the multicast overlay, the node reports its contact information to Tracker. And later on, when the node wants to change its contact information, it refreshes its contact information toward Tracker. Each of the nodes 1-6 downloads media pieces from upstream node and supplies these pieces to downstream nodes.

Firstly, each node should report its DP and SP to Tracker immediately once its DP and SP changes. In other words, once a node finished downloading a new media piece, its DP and SP will change. And then the new DP and SP will be reported to Tracker immediately. How to calculate the SP and DP will be described later. Secondly, each node reports its load status periodically to Tracker so that Tracker knows which node has available resources. In the embodiment of FIG. 3, we assume the promised delay of CDN is t0.

In the following, the process for building the media delivery overlay is described in details with reference to FIG. 3:

The media injection point is node 1, which reports its SP and load information to Tracker. When node 2 joins, it makes a request to Tracker for a node list. Tracker finds that node 1 has available resource and returns the relevant information of node 1 to node 2. So, node 2 selects node 1 as upstream node to download media from it. When node 3 comes, Tracker finds that node 2 and node 1 have available resource, and both SPs do not exceed the promised delay t0, so Node 2 and Node 1 are returned to Node 3. Node 3 tries downloading from node 1 and node 2, and finds download from either of the two nodes can satisfy the delay requirement, i.e. delay<t0. Then node 3 should select node 2, which is the node with "worst" but acceptable delay in this case, as upstream node. The remaining resources of node 1 are saved for expanding the tree in the future. Of course, if the capacity of the overlay is enough and need not be expanded any more, node 3 can choose node 1. Here since Tracker knows the status of the overlay, it can indicate node 3 to choose the "worst" or "best" node by a parameter in the returned message.

When the next node 4 comes, Tracker will put node 3, node 2 and node 1 in the node list ordered by delay time. The first node (node 3) has a delay acceptable but close to t0. Node 4 tries downloading from node 3 and finds that the delay exceeds t0, so it tries to connect node 2 and finds that the delay of the node 2 is less than t0, so node 4 takes node 2 as upstream node and downloads media from node 2. Similarly, when node 5 comes, Tracker finds that node 2 has no more resources available, and returns node 3, node 4, node 1 in turn. Since node 5 finds that node 3 and node 4 cannot fulfil delay requirement, it will select node 1. Based on the same principle, node 6 selects node 5.

So, the overlay can be constructed with the instruction of Tracker, and the delay of each node is controlled to be less than t0. The nodes with delay close to t0 are regarded as leaf nodes, and can be assigned to viewers for media delivery. In the overlay construction process, we should assign leaf node for viewers with priority and leave the other nodes (with less delay) for capacity expansion.

By means of the above logic, the tree-based architecture will grow from a very thin tree including node 1 to node 2, node 2 to node 3, and then grows to fat (adding node 4, node 5, node 6) gradually. This logic follows the policy of depth-first. That is, the tree-based architecture grows in vertical direction first until a node can not have child node due to delay restriction, then this node is regarded as a leaf node which the users can connect to for living streaming service. For the non-leaf nodes, they are saved for scaling up purpose. For live streaming service, the user number is unpredictable and the tree-based architecture can grow gradually as the user number increases. At the very beginning, there is only one leaf node (as shown in FIG. 3, node 3). If the user number increases to an extent that the leaf node's resource will be exhausted, then Tracker indicates an idle node (e.g., node 4 in FIG. 3) to join the overlay. The new node (node 4) gets a list of upstream nodes from Tracker. Here, selecting a node with "worst but acceptable delay" can make itself to be a leaf node most likely. In FIG. 3, node 4 chooses node 2 as upstream node, so that node 4 can make itself to be a leaf node and begin to serve users immediately. However, if it chooses node 1 as upstream node, node 4 will not be a leaf node, we need to add at least one more node below it to become a leaf node to provide service.

As a consequence, by means of this policy, the service capability of the overlay grows gradually. This also provides very good scalability to the CDN. Once the capacity is enough, Tracker can indicate new coming nodes to apply new policies, e.g., select node with minor delay first.

For a live streaming program with predictable viewer number, the overlay is planned with a suitable scale. For example, in the policy of breadth-first, when the user number is predictable, Tracker can indicate a new node to select the "best" upstream node instead. Also we can decide a reasonable t0 value. And selecting "best" or "worst" node is indicated by a parameter returned from Tracker together with the node list information. Such as, the response from Tracker to the requesting node is as following:
candidate node 1's contact IP address, candidate node 1's contact port number, candidate node 1's transport protocol, candidate node 1's SP;
candidate node 2's contact IP address, candidate node 2's contact port number, candidate node 2's transport protocol, candidate node 2's SP;
Flag (indicator of selecting "best" or "worst" node firstly)

With regard to the calculation of the progress factors, namely DP and SP, there are two options: calculating at node side or at Tracker side.

Figure 4:
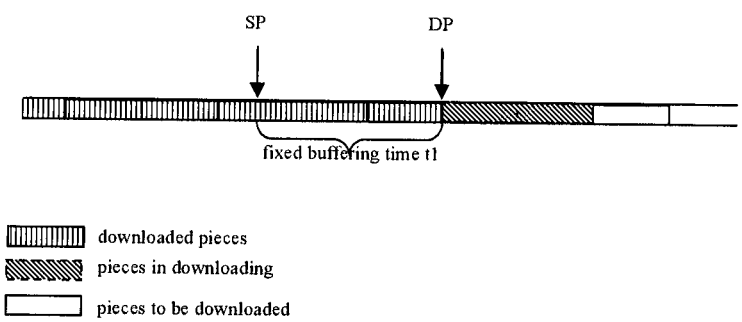
FIG. 4 shows DP and SP in the case of fixed buffering time.

In practice, DP is a strict time scale parameter in progressive download scenarios since it is clear which pieces are available at a node. The question is how to identify SP. A simple way is to define a fixed buffering time t1. So, SP should be DP−t1, see FIG. 4. In this case DP matches accurately with the end of a piece, but SP does not. This is very simple to implement, and only one parameter (SP or DP) needs to be reported to Tracker, since the other one can be calculated.

Figure 5:
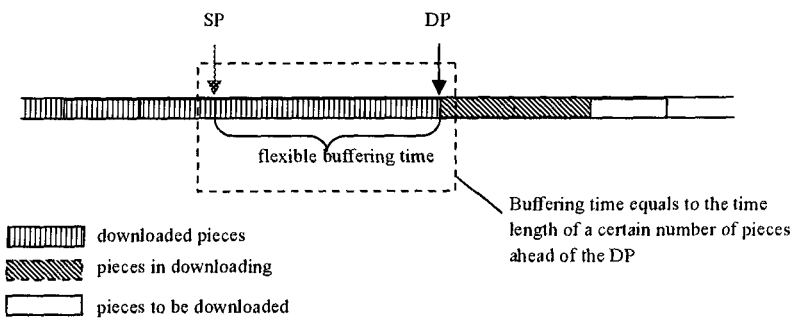
FIG. 5 shows DP and SP in the case of flexible buffering time.

For progressive download streaming service, the time length of each piece differs slightly due to the method of slicing. That is, the media file pieces have different lengths, e.g. 2.0 s, 1.9 s, 2.1 s etc. In this case, if we prefer both DP and SP matches the boundary of piece, flexible buffering time can be used. That is, if DP is defined to be the time scale of the end of the latest available piece and the buffering time is defined as the length of a certain number of pieces, then SP hits the boundary of a piece, see FIG. 5. In this case, if DP and SP are calculated at node side, both DP and SP should be reported to Tracker.

In the present invention, the above schemes of fixed buffering time and flexible buffering can be both applied.

In order to calculate DP and SP, the beginning of a source media file can be regarded as zero time scale. Suppose the source media file can be cut into n pieces, each piece has its own duration. The duration of piece i is notated as Di. If currently a node has just finished downloading m pieces, then its DP should be:

$$DP(m) = \sum_{i=1}^{m} Di.$$

If the buffering time t1 is fixed, then SP(m)=DP(m)−t1.
If the buffering time t1' is flexible (buffering k pieces), then:

$$SP(m) = \sum_{i=1}^{m-k} Di, \quad t1(m) = \sum_{i=m-k+1}^{m} Di.$$

Each piece is a small media file. For example, if it's in AVC (Advanced Video Codec) format, the duration Di is available in its file header (duration attribute). Specifically, for Apple's HTTP Live Streaming (http://datatracker.ietf.org/doc/draft-pantos-http-live-streaming/?include_text=1), the duration of each piece is written in EXTINF tag, which can be taken as Di.

Calculating at Node Side:

the node sums up the durations of all previous media pieces (from piece 1 to piece m) and gets the DP or SP in the above way. As shown in FIG. 6, once a node finished downloading a new piece (piece m), it calculates its DP (m) and SP(m), and then reports them to Tracker. When Tracker receives this report, it updates the node's DP and SP data, and sends back response.

This is an efficient way since we just need to go through the playlist file. The shortcoming is that it applies to the case where the duration of each piece is available in playlist file such as Apple's HTTP live streaming, and there could be accumulative tolerance if the duration of each previous piece is not accurate. An alternative way is to calculate the progress by making up all the previous pieces (available at each node) which can be very accurate. And this alternative way can be applied to other cases than Apple's HTPP live streaming, since the duration tag of each piece is no longer necessary. This needs additional effort for encrypted media pieces, since the node should decrypt the previous pieces to make up to a media stream. For a node joining not at the beginning, we can not assure that it has all previous media pieces either.

Calculating at Tracker Side:

the node reports its piece number to Tracker, and then Tracker calculates the progress factor. Similarly, Tracker can sum up the durations of all previous media pieces or calculate by making up the previous pieces as well. For the second approach, Tracker should work as a node to download media pieces, or more specifically, it can be the injection node of live streaming. Thus Tracker has the maximum pieces and can calculate progress by a given piece number.

For example, as shown in FIG. 7, when a node has finished downloading piece m, it reports the piece number "m" to Tracker immediately. Tracker calculates its DP(m) and SP(m), updates the node's DP and SP information in its database, and then sends back response. In this way, we can have synergy for DP and SP calculating for all nodes, especially for encrypted media case. If buffered piece number k is a constant for all nodes, it can be omitted in Report Request.

In the present invention, both options can work and calculating at Tracker side is preferred.

As mentioned in the above, node leave will cause service discontinuity issue for the downstream nodes, and cause saturation issue in tree-based overlay. The following explains how to solve the issue of service discontinuity by Tracker.

For service discontinuity issue, when a node leaves, its direct downstream nodes continue to supply media piece to their downstream nodes. At the same time these direct downstream nodes try to find new upstream node. If the downloading path from new node is finished before the buffered pieces are exhausted, service continuity is assured. Next, the direct downstream nodes download media pieces faster than usual to complement the buffering time, and the overlay reaches to a new stable status.

In the present invention, a simple approach is used to find a new upstream node and avoid saturation issue. Two thresholds for a node's load, L0 and L1, are defined. Actually, L0 and L1 should be comprehensive indicators to describe the overall load status for media delivery, which comprise CPU usage, disk space, memory, bandwidth, etc. and can be handled like ordinary indicators. Since the CDN nodes and Tracker are deployed or controlled by CDN operator, L0 and L1 are pre-configured or provisioned by GAM. Here L0 is the ordinary load threshold (e.g. 90% of overall load) which means a very safe level. L1 is the extreme load threshold which means a still safe level (e.g. 92% of overall load).

First of all, leaf nodes and the nodes whose load levels are beyond L1 should be excluded.

In normal case, each node's load should be below L0, this is assured by Tracker. When Tracker assigns nodes in ordinary case, it should choose the nodes with load levels below L0. That is, the nodes whose load levels are beyond L0 are excluded. Then Tracker selects the nodes with the lowest SP (which means the biggest delay in the case of depth-first) and sorts in descending order (a node with bigger delay is put in front). If two candidate nodes have same SP, the one with lighter load is put in front of the other. Tracker returns the first N (N is a configured parameter) candidate nodes to requesting node. If the number of available nodes is less than N, all the nodes are returned.

In abnormal case, i.e., a node leaves; each of the direct downstream nodes will check its node list for suitable substitution node. If succeeds, it continues to work with the substitution node. If fails, it initiates a special request towards Tracker asking for substitution nodes. In this case, the required SP (notated as SPx, which is equal to the left node's SP) is put in requesting message. Tracker then excludes the nodes with SP slower than SPx. The remaining nodes are divided into two groups by load level: group 1 with load level between 0 and L0, group 2 with load level between L0 and L1. In group 1, the nodes are ordered by SP from slower to faster. So, node with bigger delay is put in first. In the ideal case, some nodes, whose SP is just equal to SPx, are found and put at the beginning. And then, the nodes are ordered by load level (node with lighter load in first). The first N candidate nodes are returned. If available candidate nodes are less than N, Tracker further searches the nodes in group 2 to get more as supplement. At last, Tracker returns N nodes (if available nodes number>=N) or all the nodes (if available nodes number<N). In this way, we can avoid that the tree gets saturated. And downstream nodes of a left node can find suitable substitution nodes.

Choosing reasonable value for the parameters are very important. The buffering time t1 means delay at the node. A longer t1 means more safe time when a node leaves, but it brings longer delay too. So t1 should be equal to a value no less than the reaction time of node leave. L0 and L1 impact the resource usage efficiency of the nodes, which should be decided upon the churn status of the overlay.

Tracker is a logic entity, and can be implemented as a physical node or a distributed system.

With regard to the node in the live streaming services, the present invention provides another method for selecting a candidate node for the live streaming services. FIG. 8 shows the flowchart of this method.

As described in the above, the node can calculate progress factors based on information involved in the live streaming services at step S81. And then, at step S82, the node reports the calculated progress factors to Tracker and requests for candidate nodes list. At step S83, according to delay requirements and policies for overlay of the live streaming service, the node selects a candidate node from the candidate nodes list. The policies for overlay of the live streaming service can be indicated by a parameter returned from Tracker together with the candidate nodes list.

The method according to the invention can be applied to HTTP live streaming, and also other progressive download streaming as well.

Furthermore, the method according to the invention can be used in CDN to optimize user experience for live streaming services which work in progressive download mode. The progressive download mode is the most popular mode of current OTT (Over The Top) live streaming. Thus, CDN service providers can use the method according to the invention to do special optimization for such streaming services, and can do CDN planning and promise delay assurance to ISPs (Internet Service Provider) who want to deliver live streaming to end users.

While the invention has been described in conjunction with the above preferred embodiments, those skilled in the art shall understand that many modifications and variations can be made to the invention without departing from the spirit and scope of the appended claims.

The invention claimed is:

1. A method of providing a candidate nodes list for live streaming services, the method comprising the following steps:
    collecting information including load information of each node involved in the live streaming services, wherein the load information includes load levels regarding resources of the node;
    calculating progress factors of each node based on the information collected in the collecting step, wherein the progress factors include download progress and supply progress;
    comparing the collected load information of each node with load thresholds;
    sorting, the nodes determined in the comparing step to have collected load information which lies below the load thresholds, based on the progress factors calculated in the calculating step;
    forming the candidate nodes list by a number N of first nodes of the nodes sorted in the sorting step; and
    providing the candidate nodes list to a node requesting the candidate nodes list, wherein at least one of the nodes in the candidate nodes list is suitable for providing the live streaming services;
    wherein the load thresholds are preconfigured by Operation Administration and Maintenance (OAM) based upon overlay of the live streaming services.

2. The method according to claim 1, wherein N is a configurable parameter.

3. The method according to claim 1, wherein the information of each node includes progress information and contact information of the node.

4. The method according to claim 1, wherein the load information includes load level with regard to CPU, memory, disk space and bandwidth, and the contact information of the node includes a contact IP address, a contact port number for media download, and a transport protocol used.

5. The method according to claim 1, wherein the calculating step comprises calculating the progress factors by way of a piece number of each node.

6. The method according to claim 1, wherein the download progress is defined as time scale of a latest continuous media piece getting from upstream node, and supply progress is defined as time scale of the latest media piece affordable for download, and the calculating step comprises calculating the progress factors by summing up the durations of all previous media pieces or by making up the previous pieces.

7. The method according to claim 1, wherein the load thresholds include an ordinary load threshold and an extreme load threshold.

8. The method according to claim 7, which comprises excluding all nodes whose load level lies beyond the extreme load threshold.

9. The method according to claim 7, which comprises, in a normal case, excluding the nodes whose load level lies beyond the ordinary load threshold.

10. The method according to claim 7, wherein the step of sorting comprises sorting in descending order.

11. The method according to claim 10, which comprises, if two or more nodes have the same supply progress, placing the node with a lighter load in front of the other nodes.

12. The method according to claim 7, which comprises, when a node leaves, excluding the nodes whose supply progress is lower than the supply progress of the left node.

13. The method according to claim 12, which comprises, if no node whose load level lies below the ordinary load threshold has a higher supply progress than the supply progress of the left node, searching for the candidate node in the nodes whose load level lies beyond the ordinary load threshold and below the extreme load threshold.

14. The method according to claim 7, wherein the ordinary load threshold and the extreme load threshold are preconfigured by Operation Administration and Maintenance (OAM) based upon overlay of the live streaming services.

15. The method according to claim 14, which comprises setting the ordinary load threshold at 90% of an overall load, and setting the extreme load threshold at 92% of the overall load.

16. The method according to claim 1, which comprises, if the number of the available nodes is less than N, including all available nodes in the candidate nodes list.

17. The method according to claim 1, wherein the live streaming services are HTTP live streaming services or other progressive download streaming services.

18. A device for providing a candidate nodes list for live streaming services, configured to perform the method according to claim 1.

19. A system for providing a candidate nodes list for live streaming services, which comprises a device configured for performing the method according to claim 1.

20. A method of selecting a candidate node for live streaming services, the method comprising the following steps:
calculating by a requesting node, progress factors based on information involved in the live streaming services, wherein the information includes load information that includes load levels regarding resources of the requesting node, and wherein the progress factors include download progress and supply progress;
reporting, by the requesting node, the calculated progress factors and requesting a candidate nodes list having a number of nodes suitable for providing the live streaming services, wherein the number of nodes in the candidate nodes list is selected based on load information corresponding to each of the number of nodes and sorted based on corresponding progress factors; and
selecting, by the requesting node, a candidate node from the candidate nodes list according to delay requirements and policies for overlay of the live streaming services;
wherein the number of nodes in the candidate nodes list is configured by Operation Administration and Maintenance (OAM).

21. The method according to claim 20, wherein the policies for overlay of the live streaming services include the policies of depth-first and breadth first in tree traversal algorithms.

22. The method according to claim 20, wherein the information includes progress information and contact information of the requesting node.

23. The method according to claim 22, wherein the load information includes load level with regard to CPU, memory, disk space and bandwidth, and the contact information of the node includes contact IP address, contact port number for media download, and a transport protocol used.

24. The method according to claim 20, wherein the progress factors include download progress and supply progress, in which the download progress is defined as time scale of a latest continuous media piece getting from upstream node and the supply progress is defined as time scale of the latest media piece available for, download.

25. The method according to claim 24, which comprises calculating the progress factors by summing up the durations of all previous media pieces.

26. The method according to claim 20, wherein the policies for overlay of the live streaming services are indicated in a parameter returned with the candidate nodes list.

27. The method according to claim 20, wherein the live streaming services are HTTP live streaming services or other progressive download streaming services.

28. A device for selecting a candidate node for live streaming services, the device being configured to perform the method according to claim 20.

29. A system for selecting a candidate node for live streaming services, the system comprising: a device configured for performing the method according to claim 20.

* * * * *